(12) United States Patent
Lazarev et al.

(10) Patent No.: US 7,411,715 B2
(45) Date of Patent: Aug. 12, 2008

(54) ELECTROOPTICAL DEVICES, ELECTROOPTICAL THIN CRYSTAL FILMS AND METHODS MAKING SAME

(75) Inventors: Pavel I. Lazarev, Belmont, CA (US); Michael V. Paukshto, Foster City, CA (US); Vladimir Sulimov, Moscow (RU)

(73) Assignee: Nitto Denko Corporation, Ibaraki-shi (JP)

( * ) Notice: Subject to any disclaimer, the term of this patent is extended or adjusted under 35 U.S.C. 154(b) by 117 days.

(21) Appl. No.: 11/372,961

(22) Filed: May 15, 2006

(65) Prior Publication Data

US 2006/0203328 A1  Sep. 14, 2006

Related U.S. Application Data

(62) Division of application No. 10/295,376, filed on Nov. 15, 2002, now Pat. No. 7,042,612.

(30) Foreign Application Priority Data

Nov. 19, 2001  (RU) ............................. 2001131068

(51) Int. Cl.
*G02F 1/03* (2006.01)
(52) U.S. Cl. ...................................... 359/254; 427/162
(58) Field of Classification Search ................. 359/254, 359/245, 238, 251, 253; 438/29–30; 427/162, 427/163.2; 118/58–60
See application file for complete search history.

(56) References Cited

U.S. PATENT DOCUMENTS

| | | | |
|---|---|---|---|
| 3,775,177 A | 11/1973 | Hayama et al. | |
| 3,844,843 A | 10/1974 | Kay et al. | |
| 3,935,031 A | 1/1976 | Adler | |
| 3,992,205 A | 11/1976 | Wiedemann | |
| 4,025,704 A | 5/1977 | Trevoy | |
| 4,164,431 A | 8/1979 | Tang | |
| 4,269,738 A | 5/1981 | Pez et al. | |
| 5,079,595 A | 1/1992 | Suzuki et al. | |
| 5,104,580 A | 4/1992 | Henry et al. | |
| 5,142,393 A | 8/1992 | Okumura et al. | |
| 5,172,385 A | 12/1992 | Forrest et al. | |
| 5,525,811 A | 6/1996 | Sakurai et al. | |
| 6,058,226 A | 5/2000 | Starodubov | |
| 6,512,085 B1 | 1/2003 | Minabe et al. | |
| 7,042,612 B2 | 5/2006 | Lazarev et al. | |
| 2003/0154909 A1* | 8/2003 | Lazarev et al. | 117/44 |

* cited by examiner

*Primary Examiner*—Timothy Thompson
(74) *Attorney, Agent, or Firm*—Westerman, Hattori, Daniels & Adrian, LLP.

(57) ABSTRACT

A method of fabrication of an electrooptical device comprises depositing a colloid system of anisometric particles onto at least one electrode and/or onto at least one substrate and/or onto at least one layer of an isotropic or anisotropic material to form at least one layer of an electrooptical material, externally aligning the colloid system to form a preferred alignment of the colloid system particles, drying the colloid system, and forming at least one electrode and/or at least one layer of an isotropic or anisotropic material on at least a portion of the layer of the electrooptical material.

22 Claims, 12 Drawing Sheets

ELECTROOPTICAL DEVICES, ELECTROOPTICAL THIN CRYSTAL FILMS AND METHODS MAKING SAME

CROSS REFERENCE TO RELATED APPLICATION(S)

This application is a divisional of U.S. patent application Ser. No. 10/295,376, filed Nov. 15, 2002, now U.S. Pat. No. 7,042,612, which claims benefit of Russian Federation RU 2001131068 filed Nov. 19, 2001, the contents of which both are incorporated herein by their entirety.

FIELD OF THE INVENTION

This invention relates in general to electrooptical devices, and particularly to electrooptical devices capable of controlling radiation in the visible and near IR range.

BACKGROUND OF THE INVENTION

Electrooptical devices based on electrooptical materials such as lithium niobate ($LiNbO_3$), KDP and KTP have been hereto described. See I. P. Kaminov et al., "Optical Fiber Telecommunications", Vol. IIIB, Ed. by Academic Press (1997).

There are known electrooptical devices such as light modulators based on a D-shaped optical fiber and using a lithium niobate crystal. See W. Johnstone et al., "Fiber Optic Modulators Using Active Multimode Waveguide Overlays", Electron. Lett., Vol. 27, No. 11, 894–896 (1991). D-shaped optical fiber, also called side-polished optical fiber, refers to an optical fiber having a D-shaped cross section. Light modulators of this type are usually produced on a plane-parallel plate of a quartz glass which is provided with a groove having a curvature typically from several dozens of centimeters to several meters. A single-mode or monomode optical fiber is glued into this groove. Then the plate side having the groove with the fiber glued therein is ground until this plane reaches the fiber core so that the fundamental mode (localized predominantly in the core) can penetrate through the reflective cladding to the polished surface. After this processing, the optical fiber section becomes D-shaped. See S. M. Tseng et al., "Side-Polished Fibers", Appl. Optics, Vol. 31, No. 18, 3438–3447 (1992). The polished surface of the D-shaped optical fiber is coated with a thin transparent electrode layer of indium tin oxide (ITO) composition. Then a thin lithium niobate crystal is glued onto this electrode and ground to reduce the thickness to 20–30 microns. Finally, the second electrode is applied above the lithium niobate crystal layer.

The light modulator operates as follows. An external voltage applied to the electrooptical lithium niobate crystal changes the refractive index of the material and modifies the condition of resonance between the fundamental mode of the optical fiber and the guided modes of the lithium niobate layer. The resonance condition is essentially the condition of phase synchronism, or equal propagation constants of the guided modes of the planar optical waveguide with a lithium niobate core and the fundamental mode of the D-shaped optical fiber. When the modes are in resonance, the light signal is effectively pumped from the optical fiber into the lithium niobate crystal and the output signal intensity at the fiber end is decreased. If the applied voltage is changed so as to alter the refractive index of the lithium niobate crystal and break the resonance, the light passes through the D-shaped optical fiber without loss in intensity. In the prior art, a significant level of the output signal modulation is achieved by applying a voltage of 150 V to a 35 micron-thick control layer between ITO electrodes.

One disadvantage of the light modulator described above is that the manufacturing process for thin lithium niobate layers is very complicated. Further, the interelectrode distance determined by the thickness of the lithium niobate crystal is relatively large.

Optical switches using the same principle of operation have been described employing a layer of material with variable refractive index on the surface of a D-shaped optical fiber and a liquid crystal layer. See S. M. Tseng et al., "Low-Voltage Optical Fiber Switch", Jpn. J. Appl. Optics, Part 2, Vol. 37, L42–L45 (1998). In the optical switches of this type, a voltage about 30 V is needed to break the resonance for an interelectrode distance of 13 microns. One disadvantage of this device is the relatively low operation speed determined by the slow response of the liquid crystal. The switching time is about 7 milliseconds and the liquid crystal cannot be reoriented by an ac voltage with a frequency of 100 Hz.

There are known electrooptical devices such as light modulators having charge carrier injectors. See E. R. Mustel et al., "Light Modulation and Scanning Methods", Nauka, Moscow (1970). The light modulator of this type employs a layer of an electrooptical material representing an n-type semiconductor film on a substrate. The light propagates along this film which serves as the optical waveguide. Deposited above this n-type film is a layer of a p-type semiconductor, which forms a p-n junction. The device also contains a pair of electrodes, one in ohmic contact with the n-type semiconductor film and the other with the p-type semiconductor film, to which a control (dc or ac) voltage is applied. When a control voltage is applied to the p-n junction in the forward direction, the charge carriers (holes) are injected into the optical waveguide (n-type semiconductor film). The injection of holes into the optical waveguide increases the optical absorption of the material, thus modulating the light.

One disadvantage of this type of light modulators is the current-induced heating of the p-n junction, which requires taking special measures to thermally stabilize the entire device. Another disadvantage is the limitation imposed on the modulation frequency by the mechanism of light modulation employed in this device. Indeed, the lifetime of the minority carriers injected through the p-n junction is limited, usually to about $10^{-6}$ seconds for the holes. For this reason, the light modulators guided by the minority carrier injection can operate only at frequencies up to $10^5$–$10^6$ Hz. The electric current passed through the optical waveguide must be of sufficiently large density. This requirement poses limitations on the system dimensions. The greater the size of the device, the higher the current required to maintain the density on a level necessary for the device operation. A further disadvantage related to the electric current passage is the large energy consumption, which increases with the current value.

There are known electrooptical devices which contain a layer of a material whose optical properties change depending on the applied electric field strength. See WO 00/45202. One example of such material is ferroelectric ceramics. Ceramic materials possessing ferroelectric properties usually exhibit the phenomenon of birefringence. Thus, the ceramic layer is an electrooptical material and the applied electric field can control the device. Owing to a combination of the ferroelectric and electrooptical properties of the material, this system can be employed for controlling and modulating light signals in fiber optic communication systems, nonlinear optical devices, and electrooptical devices such as modulators, shutters, and frequency multipliers, etc.

The observed optical effects are related to orientation or reorientation of the domain polarization vector in an applied electric field. As a result, the optical axes of the ceramic grains are oriented or reoriented as well. The reorientation of domains in the electrooptical ceramic material under the action of an applied electric field is accompanied by the development of mechanical stresses perpendicular to the field direction.

One disadvantage of the ferroelectric ceramics is that they retain orientation of the domain polarization vector for an arbitrarily long time after switching off the film. Therefore, additional measures have to be taken in order to restore the initial state, such as applying control pulses with opposite polarity and half amplitude, mechanically deforming the ceramic substrate, and applying a high-frequency electric field of small amplitude. This property of the ferroelectric ceramics complicates the control system of the electrooptical devices.

Another disadvantage of the ferroelectric ceramics is the difficulty of ensuring a fast operation speed. Indeed, an increase in the light modulation rate at a given modulation efficiency requires increasing the control voltage amplitude. This fact and the delayed electrooptical response in such materials are related to the energy consumption for the formation and reorientation of the domain walls. For example, at electric pulse duration of about 2 μs, the pulse amplitude must be two times greater than the quasistatic control voltage; to reduce the pulse duration to 1 μs, the pulse amplitude must be three times greater, and so on.

Additional disadvantage is the fatigue inherent in the ferroelectric ceramic materials. Straining a ceramic material in the range corresponding to the spatial modulation of light (e.g., at the expense of partial repolarization) encounters difficulties related to the deformation character of the field-induced polarization. For this reason, repeated on-off cycles of an electric field, especially of large strength (above 5 kV/cm), lead to the accumulation of a residual deformation. This residual deformation decreases the optical contrast of modulated light, which is manifested by irreversible polarization of the electrooptical ferroelectric ceramic layer.

Another disadvantage of the above device is extremely strong temperature dependence of the characteristics of a ferroelectric layer. Temperature variations lead to changes in the optical properties of the control device. In order to exclude the temperature drift, it is necessary to provide the control device with a thermal stabilization system, which increases the energy consumption, complicates the device, and increases the cost of production.

A significant disadvantage of the device employing ferroelectric ceramics is the probability of phase distortions introduced into the data processed as a result of strong deformation of the ceramic plate and the inverse piezoelectric effect. The presence of defects and internal stresses leads to degradation of the properties of such materials which are extremely sensitive to manufacturing process parameters, making production of the devices a difficult task.

There are known electrooptical devices based on organic materials. See U.S. Pat. No. 5,172,385 to Forrest et al. and L. M. Blinov, "Electro- and Magneto-optics of Liquid Crystals", Nauka, Moscow (1978), pp. 115, 351, 352. The devices of this type contains two electrodes which are either both transparent if the system operates in the beam transmission mode, or transparent and reflecting, if the system operates in the beam reflection mode. An electrooptical material layer placed between the electrodes represents a liquid crystal, the thickness of which (interelectrode distance) is determined by sealing spacers. The electrodes are deposited onto glass substrates.

A large number of the chemical classes of organic molecules provides for a broad spectrum of materials which can be effectively used in fiber optics, integrated optics, and optical communications.

There are classes and groups of organic substances of various chemical natures, composed of the molecules or molecular chains such as phthalocyanines, polyacetylenes, aromatic hydrocarbons, conjugated polymeric systems, etc. that possess dielectric, semiconducting, and even metallic properties. A common feature of these molecules is the presence of superstructures. There are known organic films based on polymeric materials (U.S. Pat. Nos. 4,204,216; 4,663,001; 4,269,738; 5,104,580; 3,775,177; F.R. Patent No. 2,583,222), salts of linear polyaniline compounds (U.S. Pat. No. 4,025,704), phthalocyanine derivatives (U.S. Pat. Nos. 5,525,811; 6,051,702), organic dyes (U.S. Pat. No. 3,844,843), and porphyrins (U.S. Pat. Nos. 3,992,205; 3,935,031), which are widely used in modern electronic devices as the layers generating charge carriers in the course of photoelectron processes in photovoltaic devices (U.S. Pat. No. 4,164,431), solar cells (U.S. Pat. No. 3,844,843), and polarization devices (U.S. Pat. No. 5,172,385).

There are various known methods for the formation of organic films and creation of anisotropic film structures, for example Langmuir-Blodgett technique (U.S. Pat. No. 5,079,595), molecular beam epitaxy, etc. However, optical devices employing liquid-crystalline molecular compounds possess a number of disadvantages, in particular, require specially prepared substrates, alignment layers, or high-vacuum conditions for the obtaining of highly ordered and clean structures. Special and advanced technologies are employed and even these often cannot ensure the obtaining of films possessing a certain type of order and ensuring required optical anisotropy.

There are known electrooptical devices using an electrooptical material of a liquid crystal (host) matrix with dispersed organic dye (guest) molecules. See I. K. Vereshchagin et al., "Introduction to Optoelectronics", p. 173, Vysshaya Shkola, Moscow (1991), L. M. Blinov et al., "Electrooptical Effects in Liquid Crystal Materials", p. 182, Springer-Verlag, New York (1994). The control device operates on the guest-host interaction principle and is structurally analogous to that described above, comprising two electrodes which are either both transparent if the system operates in the beam transmission mode, or transparent and reflecting, if the system operates in the beam reflection mode. An electrooptical material layer placed between the electrodes represents a liquid crystal doped with dye molecules. The thickness of this layer (interelectrode distance) is determined by sealing spacers placed between the electrodes deposited onto glass substrates. The molecules of liquid crystal and dye are oriented in the same direction parallel to the alignment layers. In the absence of an applied voltage, a light polarized in the long axis of dye molecules is absorbed and no signal is transmitted through the optical device. This absorption in the dye is related to the fact that the electric field of the light polarized parallel to the long axis of the dye molecules drives electrons to oscillate between the ends of the molecule, thus consuming the beam energy. An external voltage applied to the electrodes creates an electric field in the liquid crystal. This field rotates the liquid crystal molecules and, hence, the dye molecules (due to the guest—host effect) so that the long axis of the dye molecules becomes perpendicular to the plane of polarization of the light beam. In this cease, electrons in the dye molecules are not forced to move by the electric field of the light beam.

Therefore, the light is not absorbed in the liquid crystal layer and the beam is transmitted through the optical device without significant losses.

One disadvantage of the above optical device is the relatively low operation speed of, which is characterized by a switching time on the order of 0.1 second. This device operates poorly at reduced temperatures, under which conditions the operation speed further sharply reduces. The device has insufficient working life, which amounts to about $10^4$ hours.

SUMMARY OF THE INVENTION

Accordingly, it is an object of the present invention to provide an electrooptical device that eliminates the disadvantages inherent in the known devices described above.

Another object of the present invention is to provide an electrooptical device that uses considerably low working voltages.

A further object of the present invention is to provide an electrooptical device that can control both polarized and nonpolarized light waves.

An additional object of the present invention is to provide an electrooptical device that creates voltage-controlled active devices for filtration, commutation, and modulation of optical signals.

A still further object of the present invention is to provide a low-cost, material-and-energy-saving method for producing electrooptical devices.

Another object of the present invention is to provide a method of controlling the thickness of an electrooptical anisotropic thin crystal film based on the net solid phase content in the liquid crystal phase and the thickness of an applied wet layer.

A further object of the present invention is to provide an electrooptical device that can obtain electrooptical effects without passing electric current through the layer of an electrooptical material.

A further object of the present invention is to provide a small-size electrooptical device based on optical fibers for fiber optic communication.

A further object of the present invention is to provide an electrooptical device with refractive index depending on the strength of an applied electric field or the electric field of a light wave.

A still further object of the present invention is to provide an electrooptical device with the optical absorption band shifted under the action of an applied electric field.

These and other objects of the present invention are achieved by the present electrooptical device and the method making the device. The electrooptical device of the present invention comprises at least one substrate, at least one pair of electrodes and at least one layer of an electrooptical material. The electrooptical material represents an optically anisotropic thin crystal film and contains molecules having aromatic rings and possessing a lattice with an interplanar spacing (Bragg's reflection) of 3.4±0.2 Å along one of optical axes. The electrooptical material has anisotropic refractive indices and/or anisotropic absorption coefficients that are depended on an electric field strength.

In another embodiment, the present invention provides a method of fabricating an electrooptical device. According to the present method, a colloid system of anisometric particles is deposited onto at least one electrode and/or onto at least one substrate and/or onto at least one layer of an isotropic or anisotropic material to form at least one layer of an electrooptical material. An external alignment action is applied to the colloid system to form a preferred alignment of the colloid system particles. The colloid system is then dried. At least one electrode and/or at least one layer of an isotropic or anisotropic material is then formed on at least a portion of the layer of the electrooptical material.

BRIEF DESCRIPTION OF THE DRAWINGS

The present invention will be better understood from the following description when read in conjunction with the accompanying drawings, in which.

DETAILED DESCRIPTION OF THE INVENTION

Figure 1:
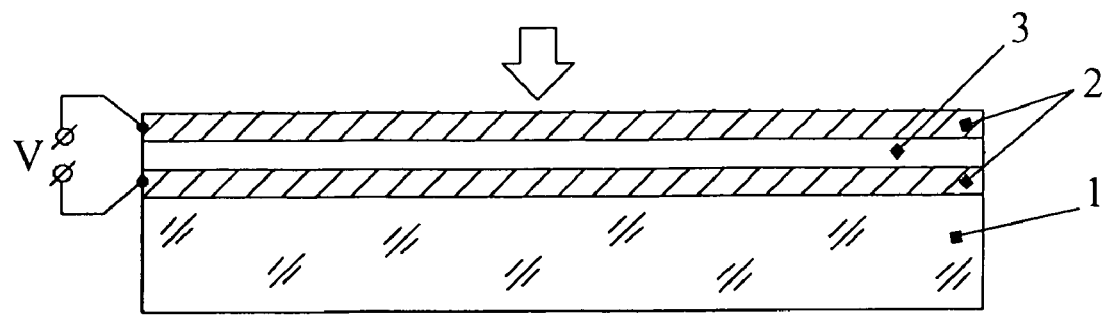
FIG. 1 is a schematic illustrating an electrooptical device in accordance with one embodiment of the present invention.

In general, the present invention provides an electrooptical device comprising at least one substrate, at least one pair of electrodes and at least one layer of an electrooptical material. The at least one layer of the electrooptical material represents an optically anisotropic thin crystal film and contains molecules having aromatic rings and possessing a lattice with an interplanar spacing (Bragg's reflection) of 3.4±0.2 Å along one of optical axes, and having anisotropic refractive indices and/or anisotropic absorption coefficients that are depended on an electric field strength.

The electrooptical anisotropic thin crystal film of the present invention has unique properties including small thickness, low temperature sensitivity, high anisotropy of the refractive index, anisotropy of the absorption coefficient, high dichroic ratio, and simplicity of fabrication. These unique properties are determined by the method of making the thin crystal film and by the features of the material, namely, by a special molecular-crystalline structure obtained through crystallization of a liquid crystal phase, containing at least one organic compound capable of forming a stable lyotropic or thermotropic liquid-crystalline phase, upon application of the liquid crystal onto an appropriate substrate, alignment, and drying. The organic substance in the present electrooptical anisotropic thin crystal film comprises at least one organic compound, the formula of which includes (i) at least one ionogenic group ensuring solubility in polar solvents for obtaining a lyotropic liquid-crystalline phase, and/or (ii) at least one nonionogenic group ensuring solubility in nonpolar solvents for obtaining a lyotropic liquid-crystalline phase, and/or (iii) at least one counterion, which may, or may not be retained in the molecular structure during formation of the material.

The electrooptical anisotropic thin crystal film comprises a great number of supramolecular complexes of one or several organic compounds such as those described in J. M. Lehn, "Supramolecular Chemistry: Concepts and Perspectives", VCH, Weinheim (1995). These supramolecular complexes are oriented in a certain manner so as to provide electric conductivity and polarization of the transmitted light.

Selection of the base material for the electrooptical anisotropic thin crystal film is determined by the presence of a developed system of $\pi$-conjugated bonds in conjugated aromatic rings and by the presence of groups such as amine, phenol, ketone, etc. lying in the plane of the molecule and entering into the aromatic system of bonds. The molecules and/or the molecular fragments possess a planar structure. These can be, for example, organic substances such as indanthrone (Vat Blue 4), 1,4,5,8-perylenetetracarboxylic acid dibenzoimidazole (Vat Red 14), 3,4,9,10-perylenetetracarboxylic acid dibenzoimidazole, quinacridone (Pigment Violet 19), etc., the derivatives of which (or their mixtures) are capable of forming a stable lyotropic liquid crystal phase.

When dissolved in an appropriate solvent, such organic compound forms a colloidal system (lyotropic liquid crystal) in which molecules are aggregated into supramolecular complexes constituting kinetic units of the system, see PCT Publication WO 02/56066. This lyotropic liquid crystal phase is essentially a precursor of the ordered state of the system, from which a solid electrooptical anisotropic thin crystal film is formed during the subsequent alignment of the supramolecular complexes and removal of the solvent.

The present method for making an electrooptical anisotropic thin crystal films from a colloidal system with supramolecular complexes includes the following steps:

application of the colloidal system onto a substrate or a device or a layer in a multilayer structure. The colloidal system typically possesses thixotropic properties, which are provided by maintaining a preset temperature and a certain concentration of the dispersed phase;

conversion of the applied colloidal system into a high flow state by any external action such as heating, shear straining to reduce viscosity of the solution. This action can be applied either during the entire subsequent alignment stage or lasts for a minimum necessary time, so that the system does not relax into a state with increased viscosity during alignment;

external alignment upon the system, which can be produced using mechanical factors or by any other means, for example by applying an external electric field at normal or elevated temperature, with or without additional illumination, magnetic field, or optical field (e.g., coherent photovoltaic effect); the degree of the external alignment should be sufficient to impart necessary orientation to the kinetic units of the colloidal system and form a structure, which serves as a base of the crystal lattice of the electrooptical anisotropic thin crystal film;

conversion of the aligned region of the layer from the state of reduced viscosity, which is achieved by the initial action, into a state of the initial or higher viscosity. This transition is performed so as not to cause disorientation of the electrooptical anisotropic thin crystal film structure and not to produce surface defects; and final drying to remove solvents to form the final electrooptical anisotropic thin crystal film structure.

In the resulting electrooptical anisotropic thin crystal film, the molecular planes are parallel to each other and the molecules form a three-dimensional crystal structure, at least in part of the crystal. Optimization of the production technology may allow the formation of an electrooptical anisotropic single crystal film. The optical axis in this single crystal is perpendicular to the plane of molecules. Such thin crystal films possess a high degree of anisotropy and exhibit, at least in one direction, a high index of refraction and/or a high absorption coefficient.

The optical anisotropy of the present electrooptical anisotropic thin crystal film is described in terms of ellipsoids of the imaginary and real parts of the complex refractive index characterized in the angular variation of the absorption coefficient and refractive index, respectively. The components of imaginary ($K_i$) and real ($n_i$) parts of the complex refractive index of the optically anisotropic thin crystal film according to the present invention should simultaneously meet the following relations:

$$K_1 \geq K_2 > K_3,$$

$$(n_1+n_2)/2 > n_3.$$

where $K_1$, $K_2$, $K_3$ and $n_1$, $n_2$, $n_3$ are the semiaxes of ellipsoids of the imaginary and real parts of the anisotropic complex refractive index of the thin crystal film material.

The components of the real and imaginary parts of the anisotropic complex refractive index, as well as the directions of the principal axes of the ellipsoid can be determined by conventional ellipsometric and spectrophotometric techniques.

The required anisotropy of the absorption coefficients ($K_1$, $K_2$, $K_3$) and the refractive indices ($n_1$, $n_2$, $n_3$), as well as the necessary orientation of the principal axes (i.e., the optical properties of the electrooptical anisotropic thin crystal film in a multilayer structure) can be ensured by establishing a certain angular distribution of molecules in the polarizing film at the substrate surface.

It is also possible to mix colloidal systems (which leads to the formation of combined supramolecules) so as to obtain a crystal film possessing intermediate optical characteristics. In the electrooptical anisotropic thin crystal film obtained from mixed colloidal solutions, the absorption coefficient and refractive index can take various values within the limits determined by the initial components. Such mixing of different colloidal systems with the formation of combined supramolecules is possible due to the coincidence of one characteristic dimension (interplanar spacing of 3.4±0.2 Å) for the organic compounds employed.

The thickness of the electrooptical anisotropic thin crystal film is determined by the content of solid substance in the applied solution. During formation of such layers, a technological parameter conveniently controlled under commercial production conditions is the solution concentration.

The degree of crystallinity of the final crystal film can be monitored by X-ray diffraction and/or by optical methods.

Using the present method, the electrooptical anisotropic thin crystal films can be formed on various substrate materials, including metals, semiconductors, dielectrics, crystals, polycrystals, glasses, polymers, and so on. Moreover, the present method allows the electrooptical anisotropic thin crystal films to be obtained on various surfaces of both simple (flat) and complicated shapes (cylindrical, conical, spherical, etc.), which allows the present electrooptical anisotropic thin crystal films to be used in electrooptical devices of most sophisticated design, for example, on the edges and side surfaces of optical fibers, on flat polished sides of such fibers, in the internal and external surfaces of the photonic crystal optical fibers (i.e., the optical fibers containing a system of longitudinal air channels in the core and/or in the reflective cladding).

Substrates onto which the thin crystal films are applied can be additionally treated to ensure homogeneous wetting of the surface to render the surface hydrophilic. The possible treatments include mechanical processing, annealing, mechanical-chemical treatment, etc. Prior to application of a thin crystal film, the substrate surface can be mechanically treated so as to form anisotropic alignment structures, which favors an increase in the degree of molecular order in the obtained thin crystal films.

The possibility of considerably reducing the level of working voltages is ensured by a small thickness of the anisotropic crystal films on the order of 100–500 nm, since the electric field strength is determined by the applied voltage (U) and the film thickness (D) through the formula E=U/D.

The possibility to create active devices for filtration, control, and commutation of both polarized and nonpolarized light waves is ensured by using the material possessing electrical and optical anisotropy with a high degree of birefringence: the electrooptical crystal film with a thickness of 0.3 micron has a maximum value of $Re(n_o-n_e)=0.85$. With conventional materials, such a birefringence is typically reached at a layer thickness of 200 microns. See P. Lazarev et al., "Thin Crystal Film Retarders", Proc. 7th Int. Workshop on Display Materials and Components, Kobe (Japan), p. 1159–60, Nov. 29–Dec. 1 (2000). The refractive index of a thin crystal film is determined by the applied electric field and can significantly differ from that of the quartz glass substrate. In addition, the thin crystal film material is photosensitive and changes its optical characteristics under the laser radiation. The refractive index is dependent on the light intensity. The present material possesses interesting nonlinear optical properties.

A low sensitivity of the present electrooptical device with respect to temperature variations is ensured by the thin crystal film possessing a high thermal stability as compared to that of conventional materials. The thin crystal film can be thermally treated at temperatures up to 180° C. in air or argon for a time period of up to four hours, with a loss in the polarization efficiency not exceeding 0.8%.

High technological properties of the present device are ensured by that a thin crystal film is readily applied onto surfaces of any shape, both technological facilities and the material being relatively cheap. High technological properties of the electrooptical material, simplicity of the thin crystal film fabrication, and convenience of the quality monitoring favor applications of the present electrooptical anisotropic thin crystal films in fiber optic communication devices such as controlled modulators, switches, couplers, attenuators, filters, etc. Using these thin crystal films, it is possible to create miniature fiber optic devices, since the small-size crystals can be readily formed on the surface of complicated shape such as the edge or side surface of an optical fiber. Optical fibers may possess extremely small dimensions by themselves. Indeed, the core of a single-mode optical fiber has a diameter of 5–10 micron and the reflective cladding diameter amounts to 125 micron.

The optical fibers can be made of various materials, including quartz glass, chalcogenide and fluoride glasses, thallium halides and some other inorganic and organic, crystalline and noncrystalline materials such as polymers or their combinations. There are three main types of the optical fibers: all-glass fibers with both core and reflective cladding made of glass; glass-plastic systems with glass core and plastic reflective cladding; and all-plastic fibers with both core and reflective cladding made of plastic.

The optical fibers may contain a core and/or one or more reflective claddings made of different materials, including quartz glass, fluoride and chalcogenide glasses, thallium halides polycrystalline halides, and polymers, etc.

Small-size electrooptical anisotropic thin crystals with dimensions from dozens to hundreds microns can be obtained on all the above fiber materials. The list of such materials is by no means restricted to the aforementioned examples.

Fabrication of the electrooptical fiber devices of the present invention involves the formation of electrooptical anisotropic thin crystal films on the surfaces of complicated geometry. The present method allows the electrooptical anisotropic thin crystal films to be obtained on various surfaces including those of both simple (flat) and complicated shape (cylindrical, conical, spherical, etc.). Therefore, the thin crystal films can be also formed a cylindrical reflective cladding of an optical fiber, on a flat oblique fiber end surface, and on a flat polished surface of the reflective cladding of a D-shaped fiber (either a curved fiber ground so that the polished plane is close to the fiber core, or a fiber drawn from the blank with a D-shaped cross section and the core situated close to the flat surface). In particular, the disclosed method allows a thin crystal films to be obtained on the surface of the reflective cladding of an optical fiber with at least one long-period grating formed in the core material. Such gratings can be formed by any suitable method such as by irradiating or doping the material and provide for a stronger interaction of a light signal with the electrooptical anisotropic thin crystal film. Since the applied thin crystal film is photosensitive, both Bragg and long-period gratings can be recorded in this film as well.

The use of anisotropic thin crystal films in electrooptical devices is based on the fact that the anisotropic refractive indices and absorption coefficients of these materials depend on the applied electric field strength, the film thickness depends on the electric field (electrostriction), and the refractive index depends on the electric component of the optical radiation field. The crystal film, forming an external coating on a fiber or planar optical waveguide, interacts with a guided mode capable of penetrating from guiding layers of the optical waveguide core into the electrooptical anisotropic thin crystal film.

The electrooptical devices of the present invention will now be described in more detail with reference to FIGS. 1 though 21.

FIG. 1 illustrates an electrooptical device comprising a substrate 1 bearing sequentially deposited layers of a first transparent electrode 2, electrooptical material representing an anisotropic thin crystal film 3, and a second transparent electrode 2. The substrate 1 can be made of ether transparent or nontransparent material including metals, semiconductors, and dielectrics. Preferably the substrate 1 is made of glass, quartz, or plastic. The transparent electrodes 2 can be made of tin oxide ($SnO_2$) or indium oxide ($In_2O_3$). The layers of $SnO_2$ with a resistivity of 300 Ohm/cm$^2$ and below are obtained by pyrolysis of $SnCl_4$ or hydrated $SnCl_2$ in a muffle furnace at 400–500° C. This technique can be used for depositing an electrode layer on a substrate prior to application of an anisotropic thin crystal film. The electrode layers can be either thin or thick, depending on the application requirements such as transparency and low electric resistance. The $SnO_2$ layers can be soldered to thin metal conductors using a dilute ethanol solution of BF-2 or BF-4 glue as a flux. The layers of indium oxide are obtained by cathode sputtering in a vacuum of $10^{-5}$ Torr. Cathode sputtering is more technologically advanced and can produce indium oxide films having approximately the same properties (mechanical strength, optical transmission, resistivity) as those of $SnO_2$ films. If a transparent conducting electrode film is used on a glass substrate, it is also possible to use $Cu_2S$ layers. Electrodes are connected to a source of dc and/or ac bias voltage.

Figure 2:
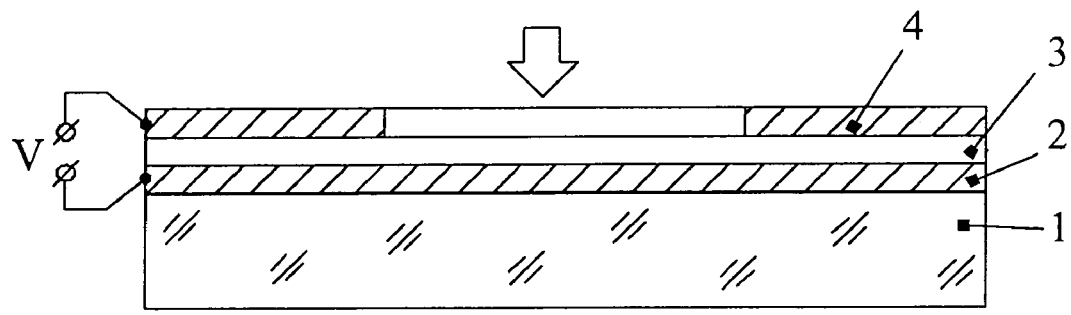
FIG. 2 is a schematic illustrating an electrooptical device containing a nontransparent electrode in accordance with one embodiment of the present invention.

FIG. 2 illustrates an electrooptical device which further comprises a nontransparent electrode 4. This nontransparent electrode can be formed on the surface of the optically anisotropic thin crystal film by spraying a metal such as aluminum in vacuum. Other candidate materials for nontransparent electrodes are gold, titanium, etc. The light transmission through the system is provided by windows, which are formed, for example, by depositing a metal electrode through a mask or by any other means.

Figure 3:
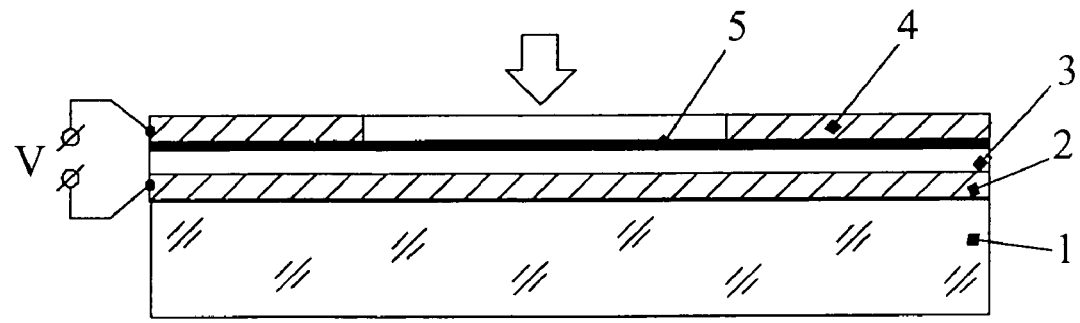
FIG. 3 is a schematic illustrating an electrooptical device containing a protective layer formed between an upper electrode and an optically anisotropic thin crystal film in accordance with one embodiment of the present invention.

FIG. 3 illustrates an electrooptical device in which an additional protective layer 5 is provided between the upper electrode 4 and the optically anisotropic thin crystal film 3. This protective layer 5 prevents mutual diffusion of the substances of the electrode and anisotropic electrooptical material. In the case of an aluminum electrode, the protective layer 5 protects the electrooptical material from aluminum atom penetration which leads to degradation of the device. Protective layer 5 can also serve as an insulating layer preventing current from passing through the electrooptical material.

Figure 4:
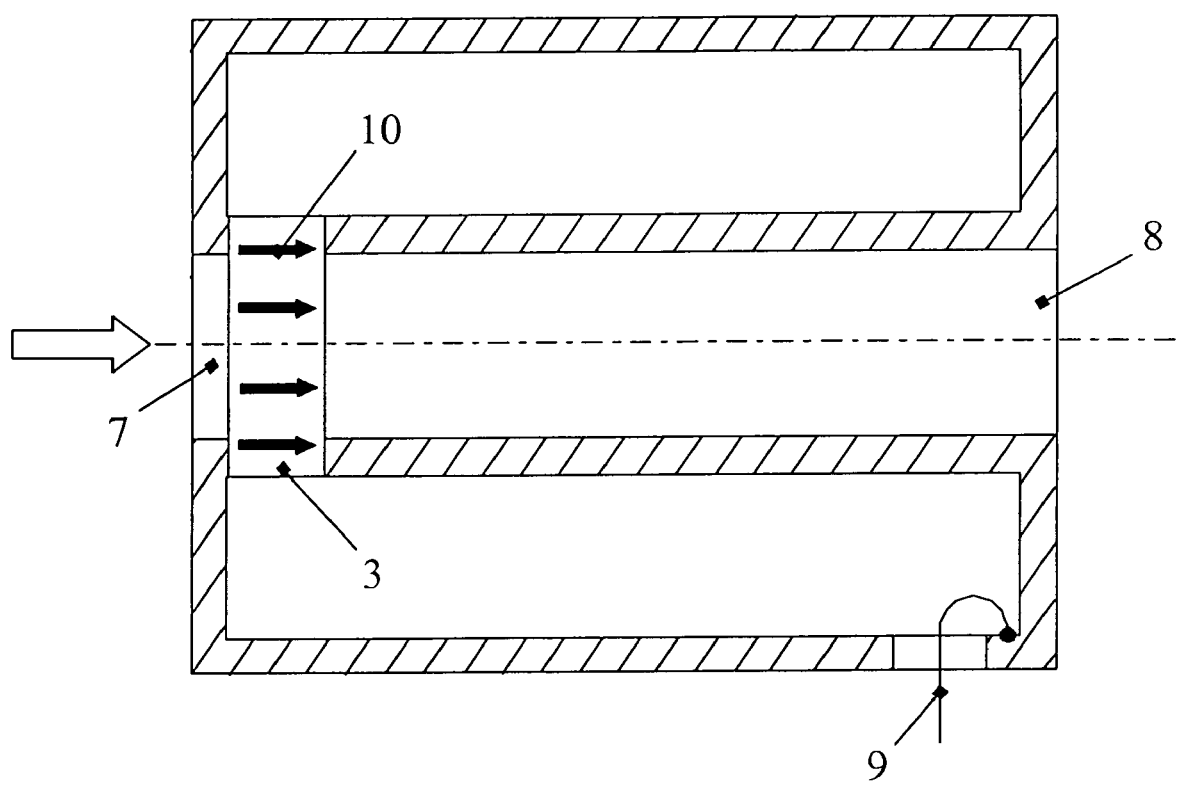
FIG. 4 is a schematic illustrating an electrooptical device representing a light modulator with a toroidal cavity in accordance with one embodiment of the present invention.

FIG. 4 illustrates an electrooptical device representing a light modulator provided with a toroidal cavity employing the longitudinal electrooptical effect in the layer of the electrooptical material 3. Here, the light beam passes along the axis of cavity 6 through windows 7 and 8 constituting a below-cutoff (evanescent) waveguide with respect to the modulation frequency. The microwave modulation signal is supplied to the cavity via feedthrough 9. In this electrooptical device, the electric field 10 is parallel to the light beam. This method of transmitting light through electrodes is preferred in the microwave range. The cavity can be considered as the section of a coaxial line shortened on one end and loaded on the other end with a capacitance of the electrooptical anisotropic thin crystal film.

Figure 5:
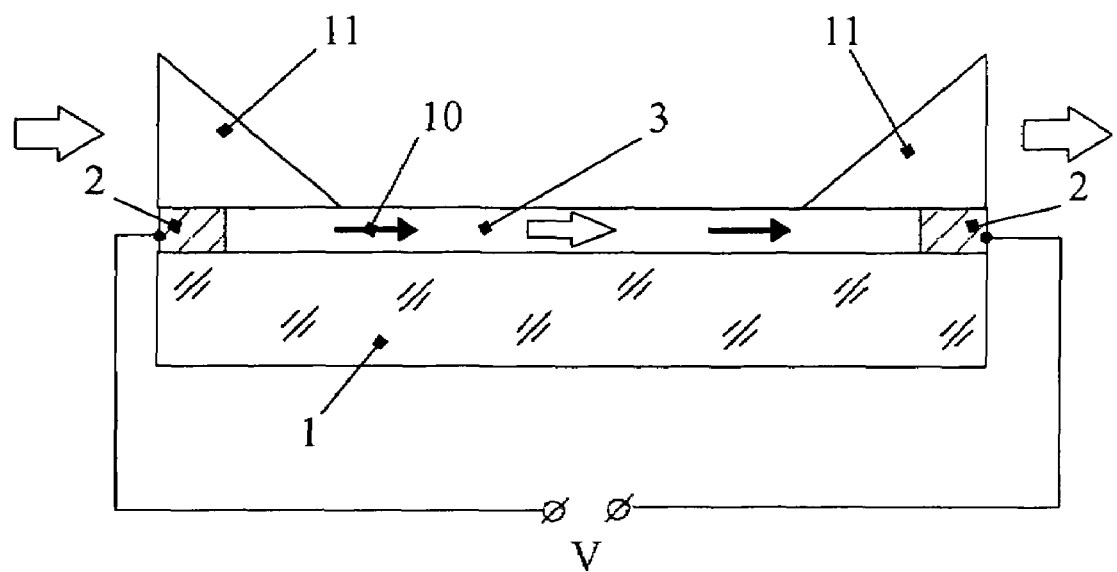
FIG. 5 is a schematic illustrating an electrooptical device in which a light beam propagates in an electrooptical anisotropic thin crystal film in the direction parallel to an applied electric field, in accordance with one embodiment of the present invention.

FIG. 5 illustrates an electrooptical device in which a light beam propagates in an electrooptical anisotropic thin crystal film in a direction parallel to the applied electric field 10. In this electrooptical device, electrodes 2 are formed on the end portions of the electrooptical material layer 3. The light beam is fed in and off the electrooptical material through optical prisms 11.

Figure 6:
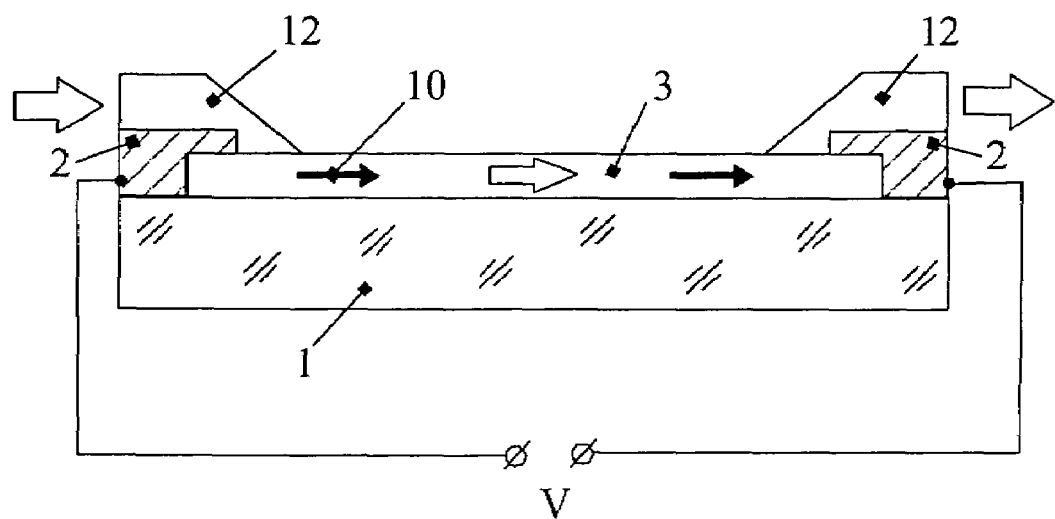
FIG. 6 is a schematic illustrating an electrooptical device in which electrodes partially extend to one surface of the electrooptical material layer in accordance with one embodiment of the present invention.

FIG. 6 illustrates an electrooptical device analogous to the one shown in FIG. 5, except that electrodes 2 extend from the end portions long the upper surface of the electrooptical material layer 3, and light beam is fed in and off the electrooptical material via optical waveguides 12 having oblique end surfaces.

Figure 7:
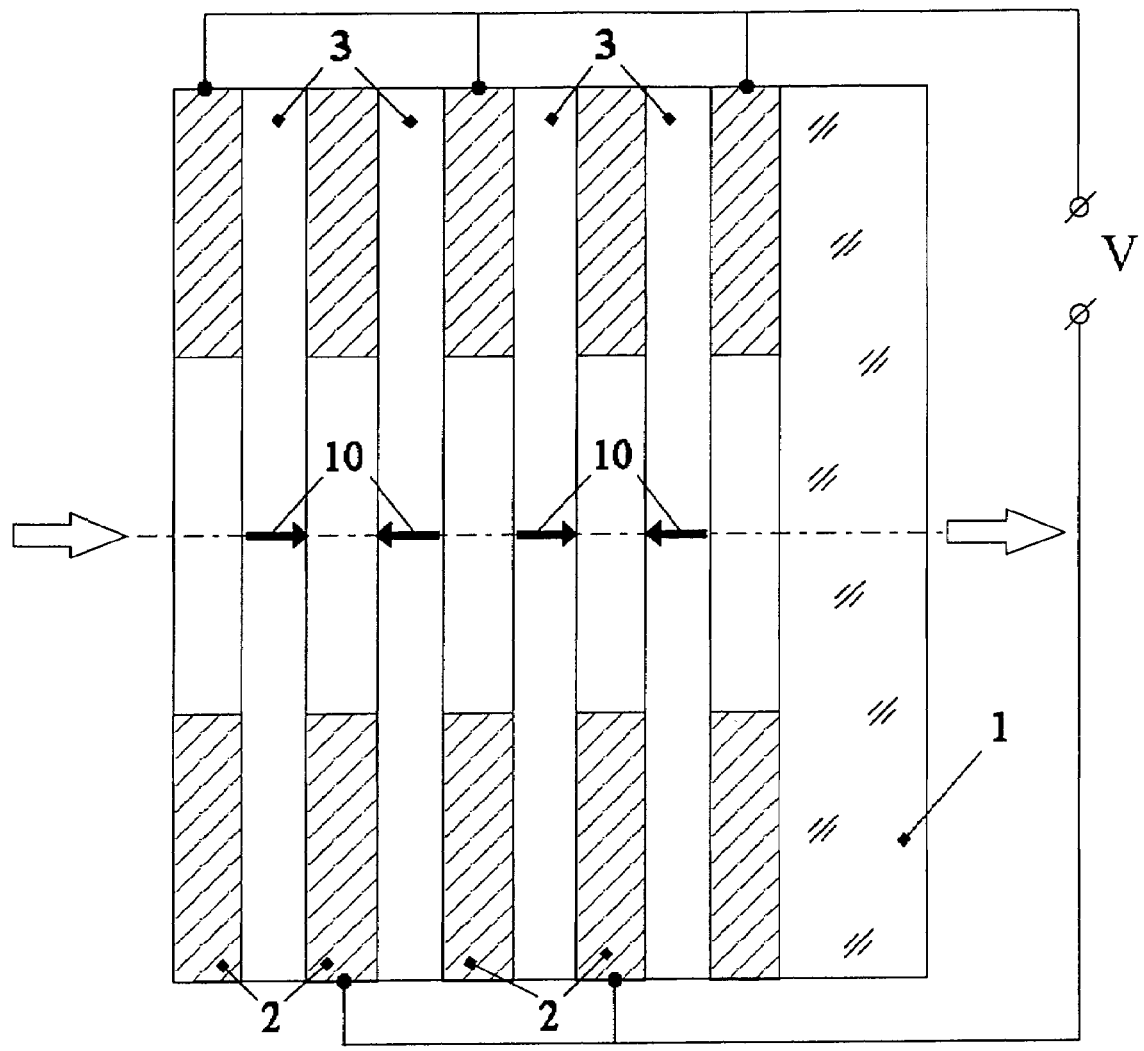
FIG. 7 is a schematic illustrating an electrooptical device representing a multilayer modulator cell in accordance with one embodiment of the present invention.

FIG. 7 illustrates an electrooptical device representing a multilayer modulator cell based on substrate 1. The electrooptical material layers 3 are separated by electrodes 2. The voltage is applied to the electrodes 2 so that the electric fields in the adjacent layers of the electrooptical material are oriented in the opposite directions. In this device, the angle between the light beam propagation direction and the electric field vector is either 0 or 180°.

Figure 8:
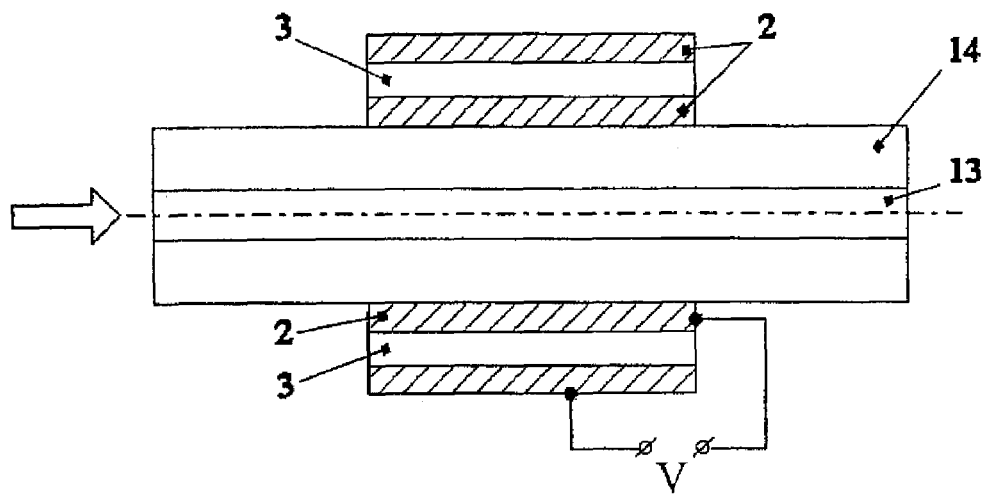
FIG. 8 is a schematic illustrating an electrooptical device in which the substrate represents an optical fiber with core and reflective cladding, in accordance with one embodiment of the present invention.

FIG. 8 illustrates an electrooptical device in which the substrate represents an optical fiber with core 13 and reflective cladding 14. This device performs the function of an optical shutter. The reflective cladding 14 of the optical fiber is covered by a cylindrical electrode layer 2, followed by a cylindrical electrooptical material layer 3 and another electrode layer 2. When an external modulation voltage is applied to the electrodes 2, the device operates as follows. If the electrooptical material 3 is characterized by the refractive index dependent on the voltage applied to the electrodes 2, the modulated control voltage changes the effective refractive index $n_{\mathit{eff}}$ of the reflective cladding 14 surrounding the fiber core 13 in the region where the electrooptical layer 3 and electrodes 2 are situated. When the effective refractive index $n_{\mathit{eff}}$ is smaller than that of the fiber core, the light beam will deviate from the reflective cladding 14 toward the core 13 and, hence, will be guided. If the effective refractive index $n_{\mathit{eff}}$ is greater than that of the fiber core, the light beam will pass through the electrooptical material layer 3 without reflection. If the electrooptical material 3 is characterized by the absorption coefficient depending on the external voltage, the light beam is modulated as a result of the guided variation of the optical absorption in the region where the electrooptical layer 3 and electrodes 2 are situated. The present anisotropic thin crystal film has extremely high anisotropy of both the refractive indices $n_o$ and $n_e$ and the absorption coefficients. For this reason, the device as shown in FIG. 8 allows the optical modes of different polarization to be also controlled as described.

Figure 9:
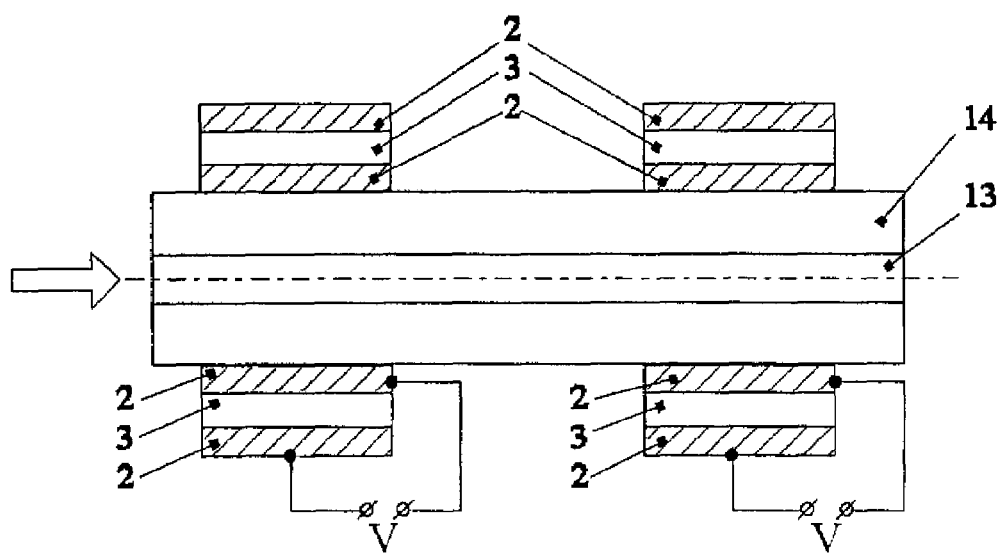
FIG. 9 is a schematic illustrating an electrooptical device in which the active (voltage-controlled) system of two cylindrical electrodes and electrooptical layers is formed in two regions on the optical fiber, in accordance with one embodiment of the present invention.

FIG. 9 illustrates an electrooptical device in which the active (voltage-controlled) system of two cylindrical electrodes 2 and electrooptical layers 3 is formed in two regions on the optical fiber. This device provides for a deeper optical modulation and can also perform the function of an optical shutter.

Figure 10:
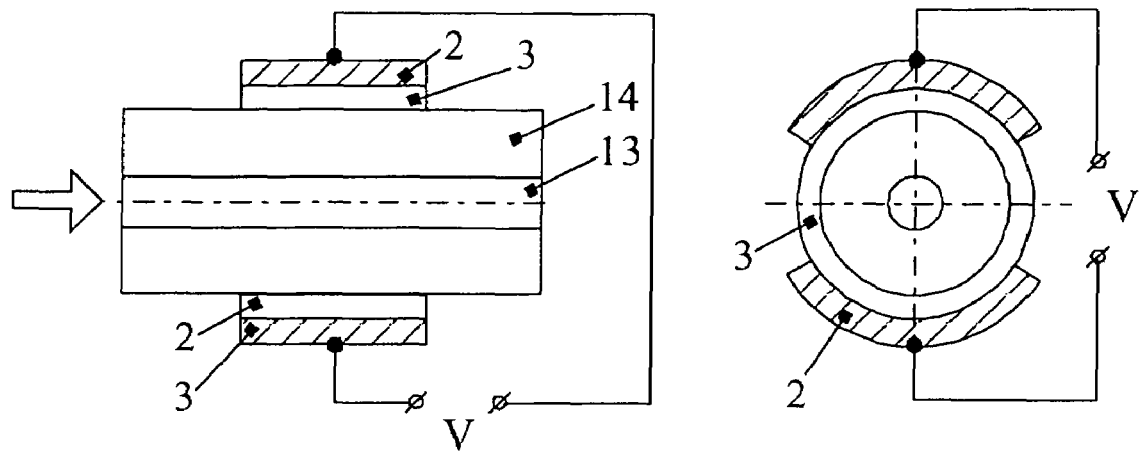
FIG. 10 is a schematic illustrating an electrooptical device in which the cylindrical electrooptical material layer is formed on the surface of the reflective cladding of an optical fiber, in accordance with one embodiment of the present invention.

FIG. 10 illustrates an electrooptical device in which the cylindrical electrooptical material layer 3 is formed on the surface of reflective cladding 14 of an optical fiber with the core 13. In this device, two electrodes 2 are arranged on the same external cylindrical surface of the electrooptical material as depicted in the cross section. The device operates as follows. Variation of the control voltage leads to a change in the effective refractive index $n_{\mathit{eff}}$ of the reflective cladding and/or in the absorption coefficient of the electrooptical layer 3. The light beam is modulated due to its reflection from the fiber cladding 14 (when $n_{\mathit{eff}}$ is smaller than the refractive index of the fiber core), or due to emission from the fiber (when $n_{\mathit{eff}}$ is greater than the refractive index of the fiber core). The second mechanism of modulation is related to the field-induced variation of the absorption coefficient of the electrooptical material. In this embodiment, the device can be used as an optical shutter. Owing to a high degree of optical anisotropy, the disclosed device can also be used to control the light with respect to polarization.

Figure 11:
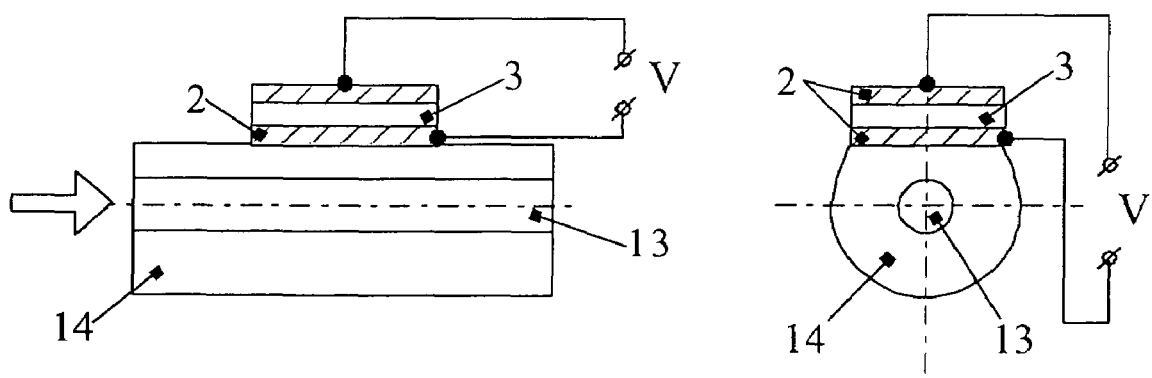
FIG. 11 is a schematic illustrating an electrooptical device in which the active (voltage-controlled) system of two electrodes and electrooptical layer is formed on a flat surface of the reflective cladding of a D-shaped optical fiber, in accordance with one embodiment of the present invention.

FIG. 11 illustrates an electrooptical device in which the active (voltage-controlled) system of two electrodes 2 and electrooptical layer 3 is formed on a flat surface of the reflective cladding 14 of a D-shaped optical fiber with the core 13 situated closer to the flat interface.

Figure 12:
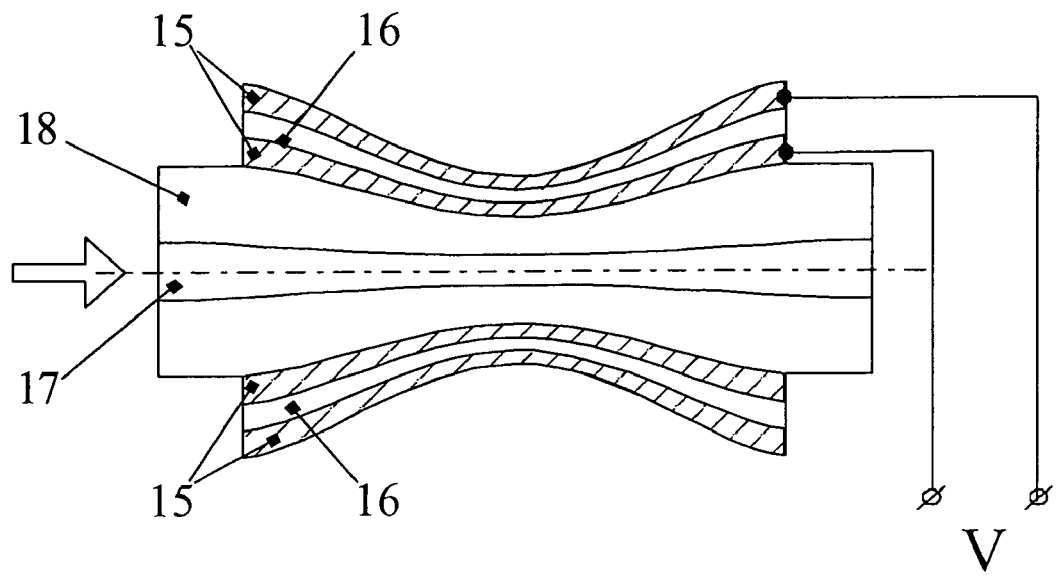
FIG. 12 is a schematic illustrating an electrooptical device in which the active (voltage-controlled) system of two electrodes and electrooptical layer is formed in a region of "waist" of the optical fiber, in accordance with one embodiment of the present invention.

FIG. 12 illustrates an electrooptical device in which the active (voltage-controlled) system of two electrodes 15 and electrooptical layer 16 is formed in a region of "waist" of the optical fiber. Such a waist can be obtained by local heating and extending of the fiber. In the waist region, the fiber has variable cross sections. An advantage of using waists in the device is related to the fact that the fiber core 17 in such regions is closer to the electrooptical layer 18 formed on the reflective cladding surface. As a result, the light propagating in the core interacts more strongly with the electrooptical material.

Figure 13:
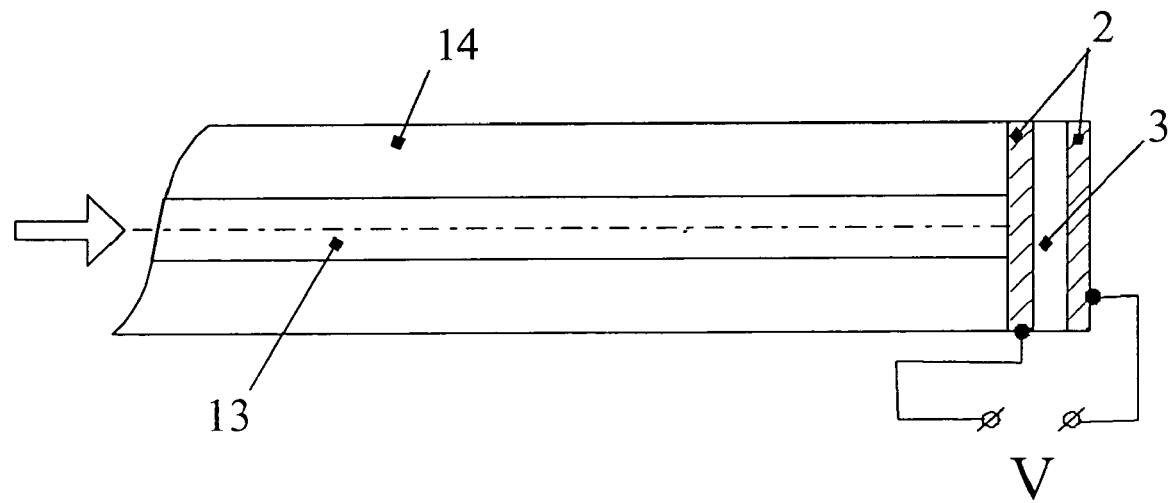
FIG. 13 is a schematic illustrating an electrooptical device in which the active (voltage-controlled) system of two electrodes and electrooptical layer is formed on a flat end surface of a fiber with the core and the reflective cladding, in accordance with one embodiment of the present invention.

FIG. 13 illustrates an electrooptical device in which the active (voltage-controlled) system of two electrodes 2 and electrooptical layer 3 is formed on a flat end surface of a fiber having core 13 and reflective cladding 14. By applying the control voltage between electrodes 2, it is possible either to reflect the beam from the end or to allow the light passing through the electrooptical material. If the variable electric field changes the absorption coefficient of the electrooptical material, the light beam is either passed virtually without attenuation, or fully absorbed in the electrooptical layer. This device can employ a multilayer structure instead of a single electrooptical material layer 3. The multilayer structure may consist of alternating layers with high and low values of the refractive index and/or with the principal optical axes oriented at an angle from 0 to 90 degrees relative to one another. The thickness of the layers can be taken equal to $\lambda/4n$, where $\lambda$ is the light wavelength and n is the refractive index. In general, such multilayer structure can be used as a band-pass or band-stop filter; the low- and high-pass filters can be also implemented based on such multilayer structures.

Figure 14:
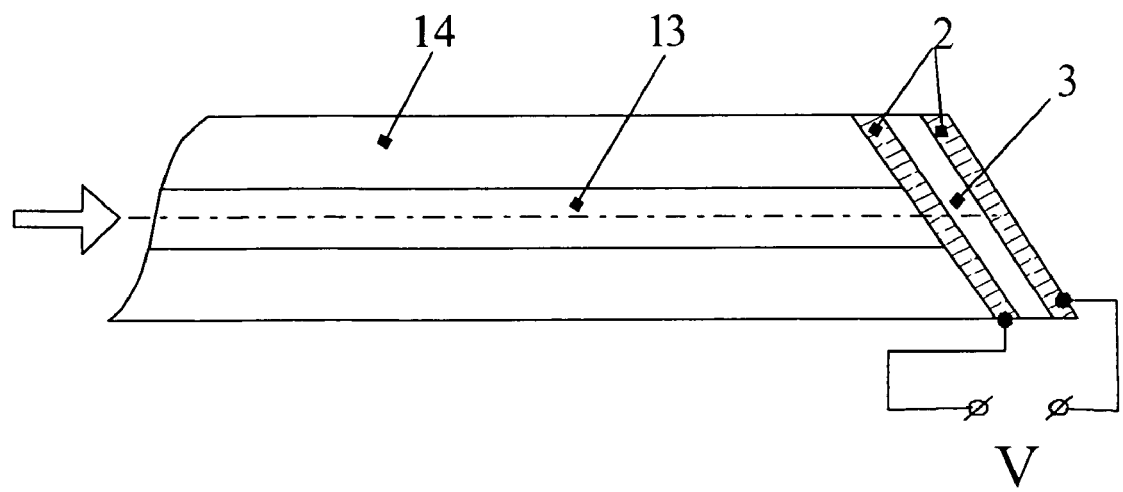
FIG. 14 is schematic illustrating a guided electrooptical device based on an optical fiber with oblique end surface.

FIG. 14 illustrates an electrooptical device based on an optical fiber with oblique end surface. In this device, the active (voltage-controlled) system of two electrodes 2 and electrooptical layer 3 is formed on the flat end surface of a fiber with core 13 and reflective cladding 14. This design of the electrooptical device allows the light beam to be extracted from the fiber. As the device shown in FIG. 13, this device can also employ a multilayer structure instead of a single electrooptical material layer 3, comprising a set of optically isotropic and/or anisotropic, electrooptical and/or non-electrooptical materials.

Figure 15:
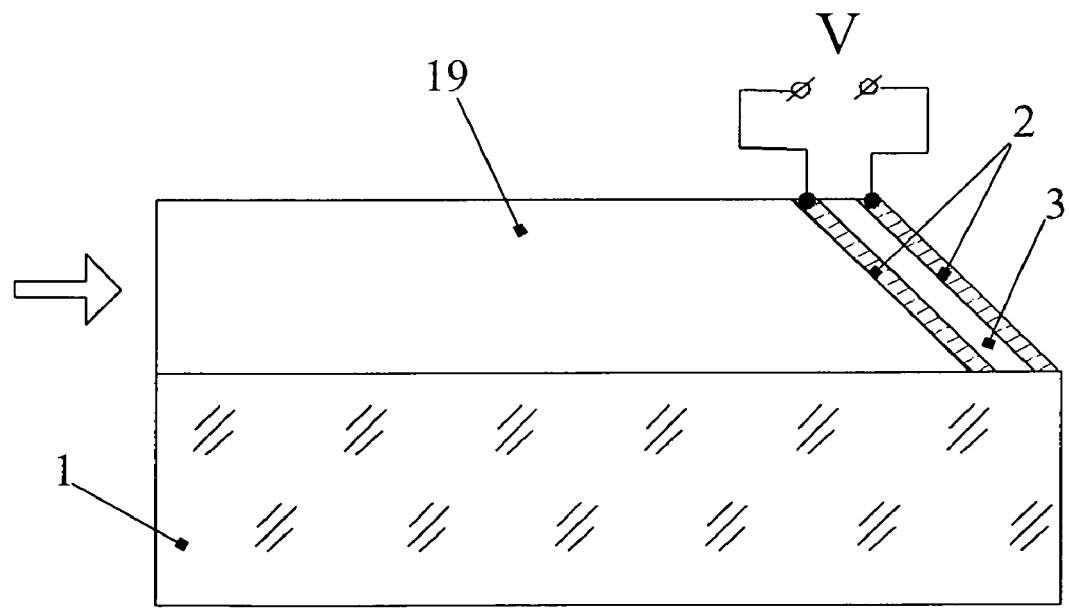
FIG. 15 is a schematic illustrating an electrooptical device operating on the same principle as in FIG. 14, in accordance with one embodiment of the present invention.

FIG. 15 illustrates an electrooptical device operating on the same principle. In this embodiment, the active (voltage-controlled) system of two electrodes 2 and electrooptical layer 3 is formed on an oblique end of an optical waveguide 19, for example, of a planar design mounted on substrate 1. As the devices shown in FIGS. 13 and 14, this device can also employ a multilayer structure instead of a single electrooptical layer 3. Moreover, this type of devices is not limited to the geometry illustrated in FIG. 15. For example, the optical waveguide layer may be provided with a tapered or wedge-shaped end.

Figure 16:
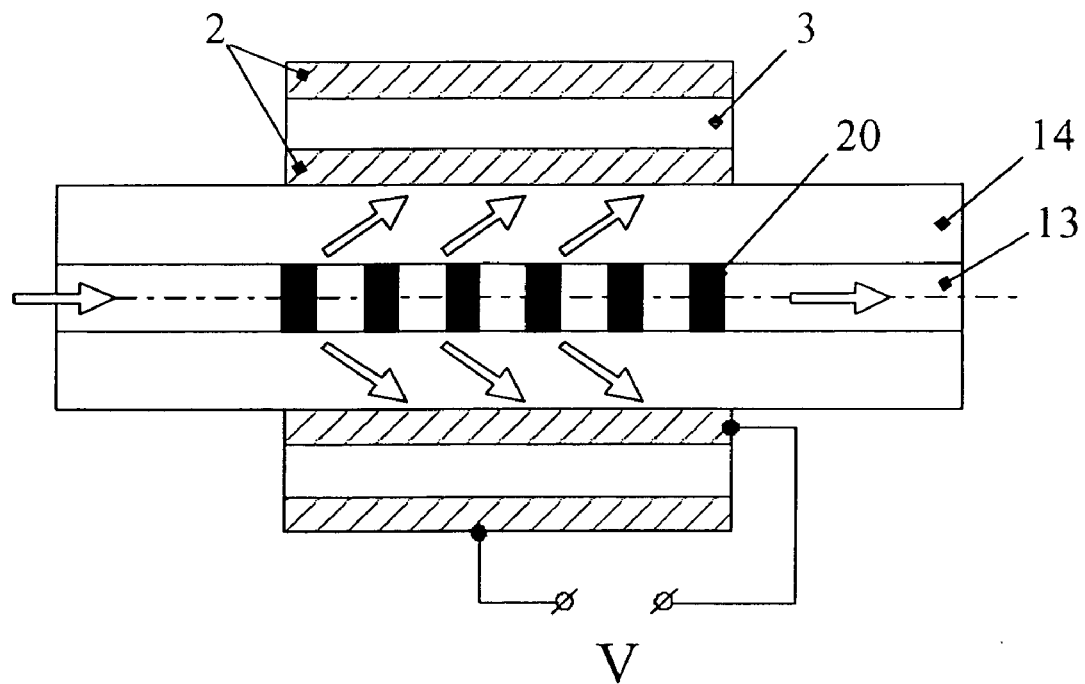
FIG. 16 is a schematic illustrating an electrooptical device based on an optical fiber with a long-period grating formed in the fiber core, in accordance with one embodiment of the present invention.

FIG. 16 illustrates an electrooptical device based on an optical fiber with a long-period (100–160 micron) grating 20 formed in the fiber core 13. This grating 20 either transforms the fundamental optical mode, or any other guided axial mode with the field concentrated in the paraxial region, into a peripheral mode propagating in the reflective cladding, or vice versa, converts peripheral modes into the fundamental mode or any other guided axial mode. The long-period grating ensures effective coupling of the guided axial modes and the peripheral modes owing to the phase synchronism condition. For this reason, such grating enhances the interaction of light with the active system of electrodes 2 and electrooptical layer 3 formed on the surface of reflective cladding 14 of the fiber. The electrooptical anisotropic thin crystal film selectively interacts with the light beam, acting only upon the modes corresponding to the grating period. Since the anisotropic thin crystal film has a very high anisotropy, the disclosed device can provide for the selection of modes with different polarizations. In addition, once the thin crystal film is characterized by a strong dependence of the absorption coefficient on the electric field, this device can also perform modulation of light with a selected wavelength with respect to absorption.

Figure 17:
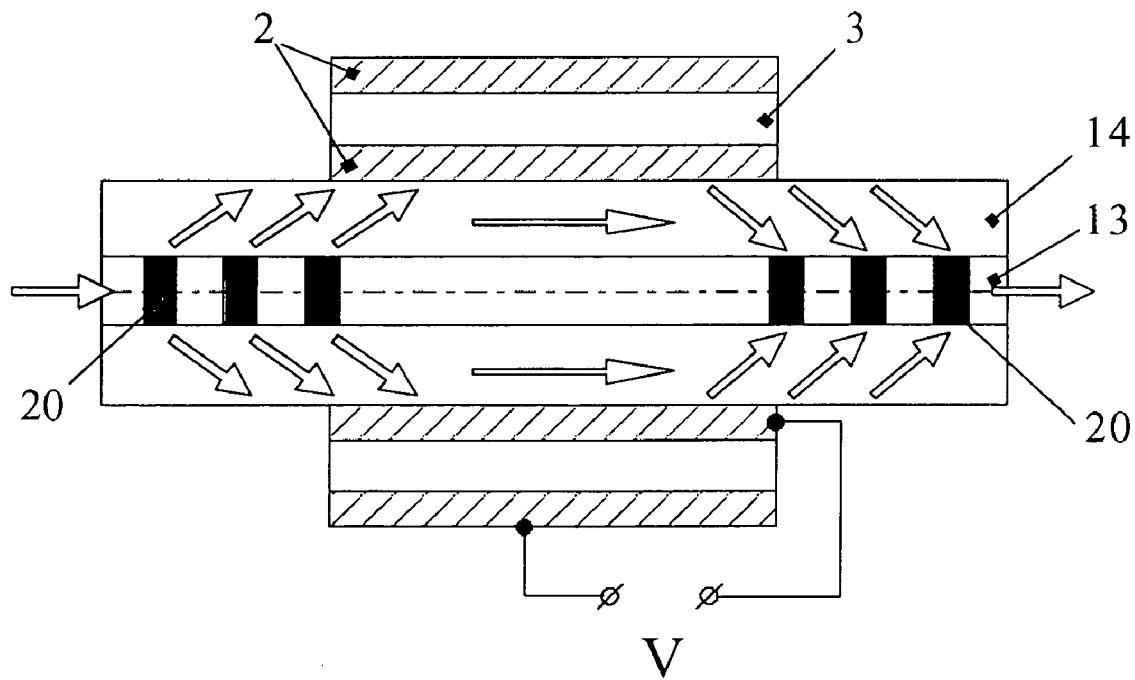
FIG. 17 is a schematic illustrating an electrooptical device having two long-period gratings formed in the fiber core and an active system of electrodes and electrooptical layer formed in the region between the two gratings on the surface of reflective cladding of the fiber, in accordance with one embodiment of the present invention.

FIG. 17 illustrates an electrooptical device with two long-period gratings 20 formed in the fiber core 13 and the active system of electrodes 2 and electrooptical layer 3 formed in the region between the two gratings on the surface of reflective cladding 14 of the fiber. Here, the first long-period grating separates the corresponding modes and transforms them into peripheral modes propagating in the reflective cladding, while the second long-period grating drives these modes back to the core. The active system of the electrodes and electrooptical layer acts upon the light traveling in the reflective cladding. Similarly to the above example, this device can perform modulation of light with a selected wavelength with respect to absorption because the thin crystal film is characterized by a strong dependence of the absorption coefficient on the electric field. Owing to the anisotropy of the thin crystal film, this device can also perform modulation of light with respect to polarization.

Figure 18:
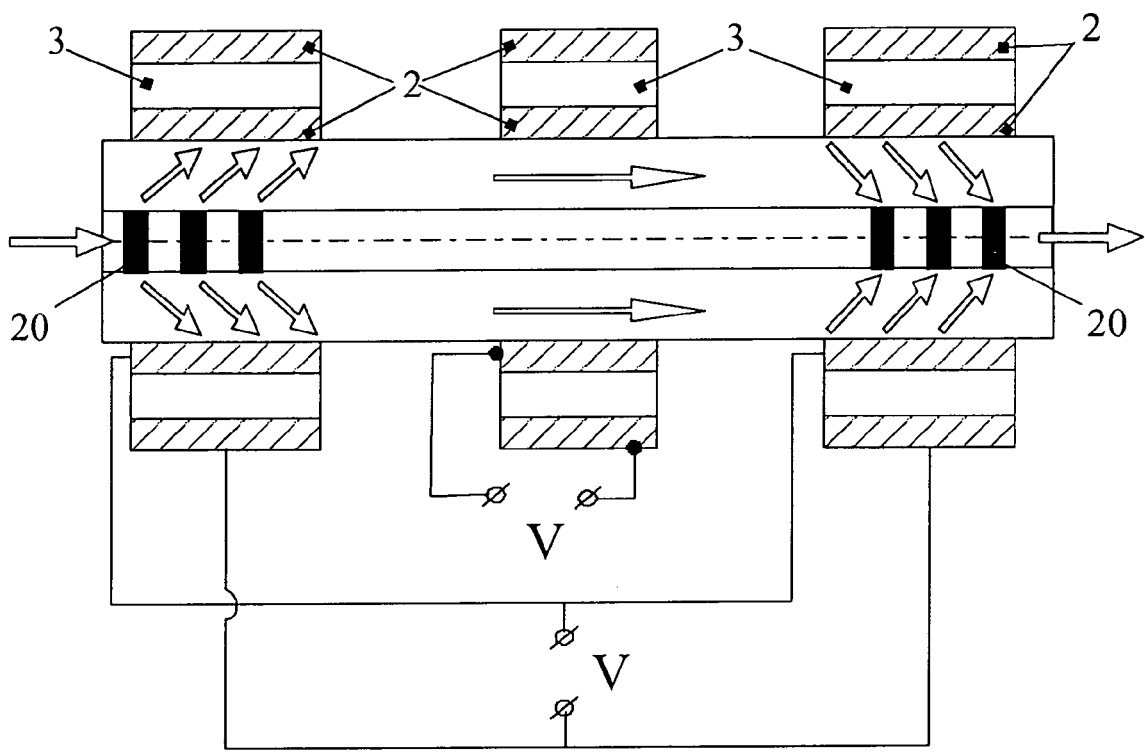
FIG. 18 is a schematic illustrating an electrooptical device combining the features of the devices depicted in FIGS. 16 and 17, in accordance with one embodiment of the present invention.

FIG. 18 illustrates an electrooptical device which is a combination of the devices as shown in FIGS. 16 and 17.

Figure 19:
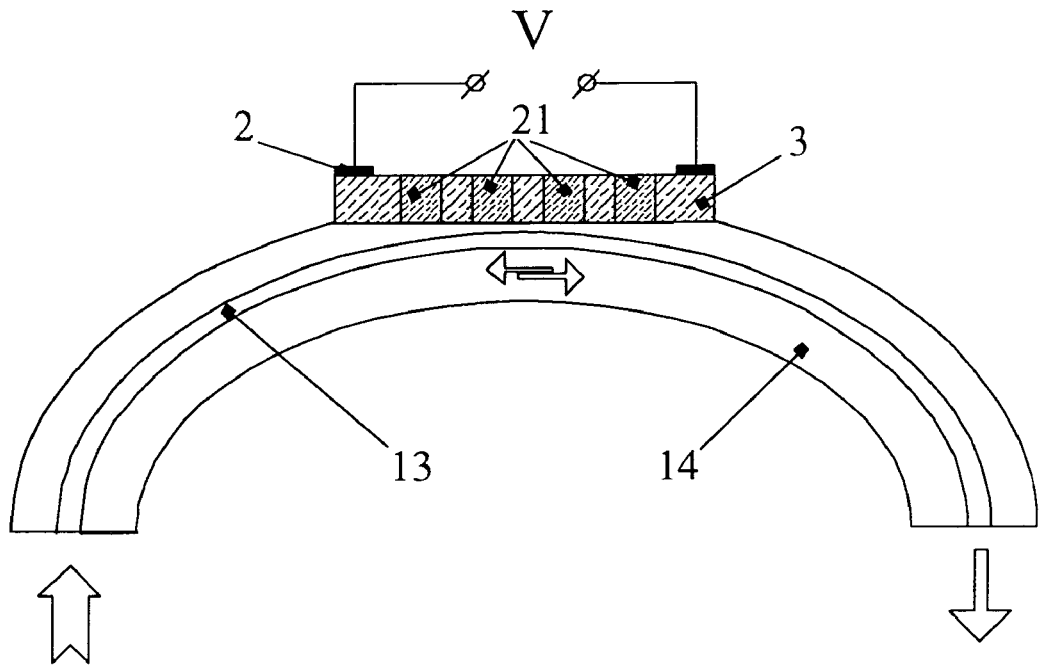
FIG. 19 is a schematic illustrating an electrooptical device employing the Bragg grating formed in the layer of an electrooptical material by creating the corresponding profile of the refractive index, in accordance with one embodiment of the present invention.

FIG. 19 illustrates an electrooptical device employing the Bragg grating 21 formed in the layer of an electrooptical material 3 by creating the corresponding profile of the refractive index, which can be achieved through variation of the film composition or by laser irradiation. The electrooptical layer 3 with the Bragg grating 21 is placed onto the flat polished surface of a D-shaped optical fiber with core 13 and reflective cladding 14. The control voltage is applied between the two electrodes 2 deposited onto the surface of electrooptical layer 3. Application of the field modifies the properties of the Bragg grating and hence changes the wavelength of light reflected from the grating.

Figure 20:
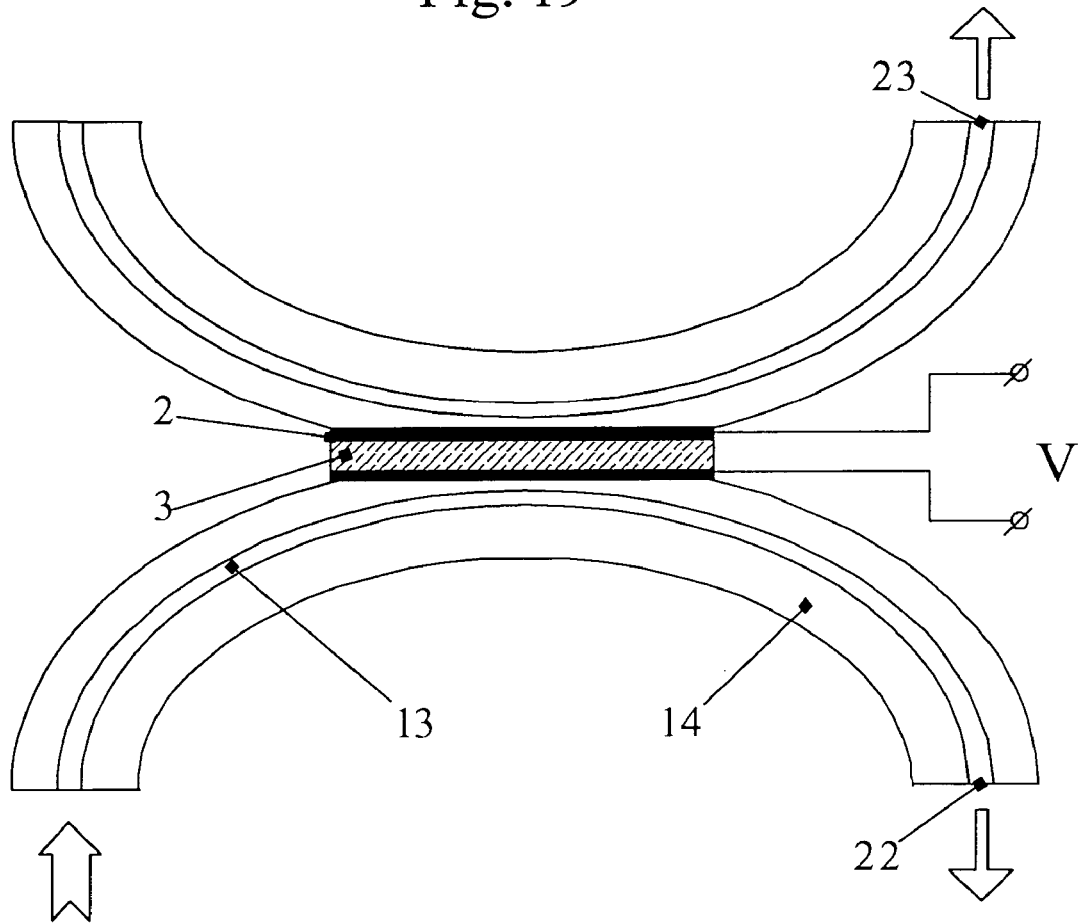
FIG. 20 is a schematic illustrating an electrooptical device comprising two single-mode D-shaped optical fibers with the cores and the reflective claddings, which are rotated with their flat polished surfaces toward each other, in accordance with one embodiment of the present invention.

FIG. 20 illustrates an electrooptical device comprising two single-mode D-shaped optical fibers with cores 13 and reflective claddings 14, which are rotated with their flat polished surfaces toward each other. An active multilayer structure consisting of two electrodes 2 and electrooptical material 3 is confined between the two optical fibers. A dc and/or ac control voltage is applied between the transparent electrodes. This device performs the function of an optical switch, the operation of which is based on the refractive index of the electrooptical material being dependent on the electric field strength. A field-induced change of the refractive index alters the propagation constants of modes guided by a planar optical waveguide structure formed by the electrooptical film (waveguide core) and the reflective cladding and the electrode material (reflecting layers). A change in the propagation constants of the planar waveguide modes alters the conditions of resonance between these modes and the fundamental mode of the optical fiber. If the control voltage is such that the initial optical signal with a given wavelength is out of resonance with all guided modes of the planar optical waveguide formed by the electrooptical film, the signal is transmitted to the first fiber output 22. If the control voltage is such that the initial optical signal with a given wavelength is in resonance with one of the guided modes of the planar optical waveguide formed by the electrooptical film, the signal is pumped into the planar waveguide and, upon exciting the fundamental mode of the second fiber, is transmitted to another output 23.

Figure 21:
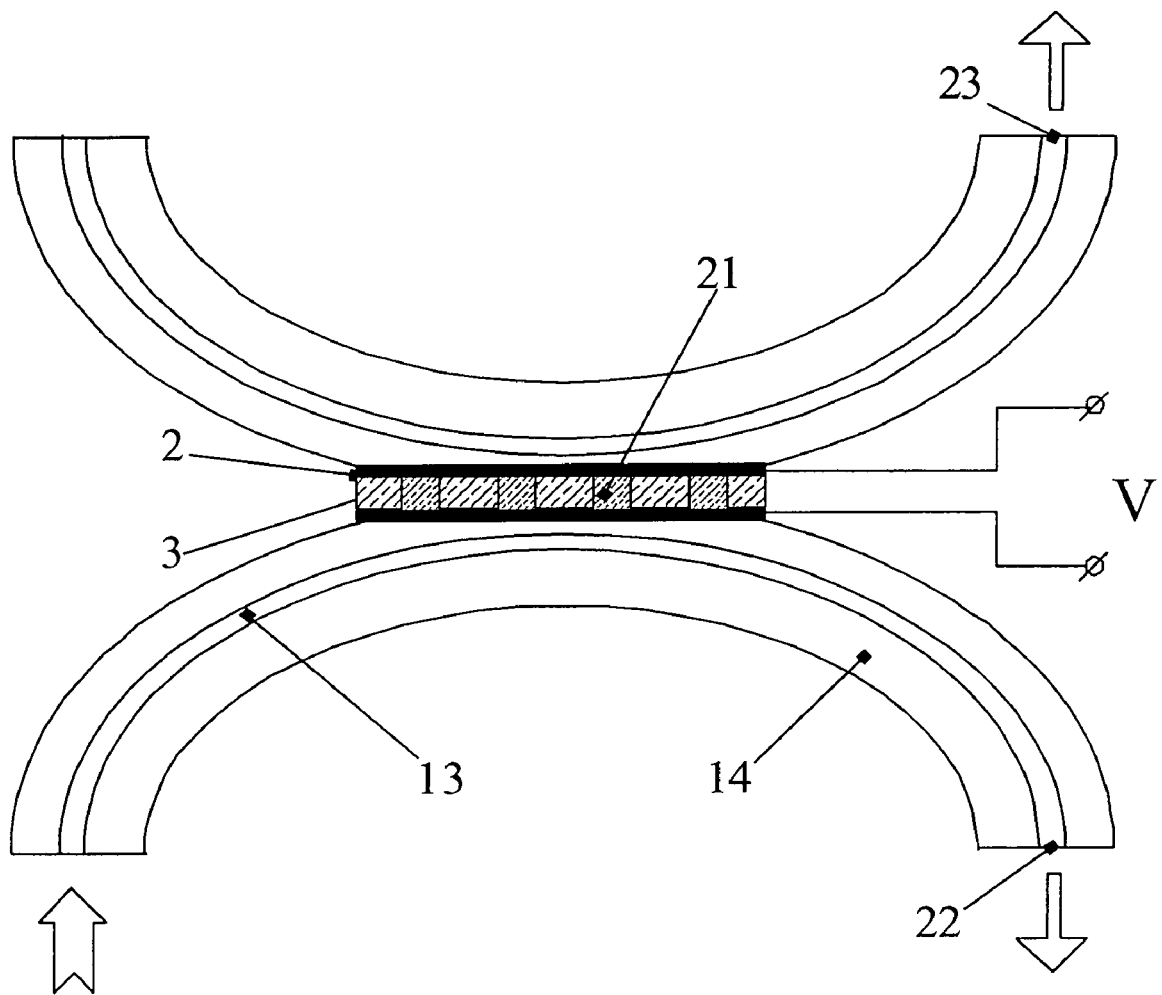
FIG. 21 is a schematic illustrating an electrooptical device, comprising two single-mode D-shaped optical fibers rotated with their flat polished surfaces toward each other, in accordance with one embodiment of the present invention.

FIG. 21 illustrates an electrooptical device comprising two single-mode D-shaped optical fibers rotated with their flat polished surfaces toward each other. Confined between the two optical fibers is an active multilayer structure consisting of two electrodes 2 and electrooptical material layer 3 in which a long-period grating is formed, for example, by laser irradiation. A dc and/or ac control voltage applied between the transparent electrodes changes the optical parameters of the long-period grating. Here, the control of radiation in the visible and near IR range (modulation of the optical signal and/or switching between the two channels) is due to the long-period grating ensuring phase synchronism between the modes of different optical waveguides and thus effectively coupling these modes.

The following examples are provided to illustrate the present invention and not intended to limit the scope of the invention in any way.

EXAMPLE 1

This example illustrates the manufacture of an electrooptical anisotropic thin crystal film of a lyotropic liquid crystal based on sulfided indanthrone organic dye.

The films were prepared from a 9.5% aqueous solution of sulfided indanthrone capable of forming a hexagonal phase at room temperature. This organic dye occurred in the solution in the form of anisometric supramolecular complexes, which formed the basis of a crystal structure of the target film. The initial paste was applied onto a clean silicon or glass substrate by means of casting and spreading. Then the colloid system was treated to reduce the viscosity for the subsequent alignment step. The resulting solution formed a nematic phase or a mixture of nematic and hexagonal phases with a viscosity reduced from 1780 to 250 mPa/s. This preliminary conversion of the colloidal system into a high flow state is a first step before obtaining the high-quality anisotropic thin crystal films of the present invention.

The next operation was the alignment of the kinetic units of the colloidal system of the lyotropic liquid crystal. The alignment action could be provided by various techniques. In this example, the alignment was performed using a Meyer wiper No. 4 with a wire wound so as to control a wet layer thickness at 9.5 mm. During the alignment process, the wiper velocity was 13 m/s. Shear stresses arising during the wiper action upon the layer produced additional decrease in the system viscosity.

The final stage was drying. The rate of solvent removal was controlled to be sufficiently small not to alter the target structure formed in the preceding stage. In this example, the drying was performed at room temperature and a humidity of 60%.

As a result, anisotropic thin crystal films were obtained with a thickness of 0.3–0.4 micron, possessing a high anisotropy of the optical and electrical properties. The films were characterized by homogeneity of the parameters along the film surface and by good reproducibility from one batch to another. The high crystal structure perfection of the films was confirmed by optical methods and by X-ray diffraction.

EXAMPLE 2

This example illustrates the manufacture of electrooptical devices of the present invention.

A layer of $SnO_2$ with a thickness of 0.5 micron was formed by a conventional method. Above this film, an electrooptical anisotropic thin crystal film was formed according to the above described method, which was filled by a protective acetate film with a thickness of 10–20 nm. Then aluminum strips of four millimeter wide were deposited in vacuum onto the acetate film surface. Finally, the electrodes were attached and connected to a source of dc and/or ac control voltage.

EXAMPLE 3

This example illustrates the manufacture of an electrooptical device based on a D-shaped optical fiber A metal film was deposited on the flat surface of a D-shaped optical fiber. Then a gap of about five to ten micron wide was formed by a laser beam to divide the metal layer into two electrodes. Finally, an electrooptical anisotropic thin crystal film was formed above this multilayer structure according to the above described method.

Of advantages, the electrooptical devices of the present invention is capable of controlling radiation in the visible and near IR range. The electrooptical devices of the invention comprises layers of materials with variable refractive indices and/or absorption coefficients dependent on the strength of an applied electric field and/or the electric field component of visible or IR radiation. The electrooptical materials used in the present invention possess a number of useful properties including linear variation of the refractive index depending on the applied field strength (Pockels effect), quadratic variation of the refractive index depending on the applied field strength (electrooptical Kerr effect), optical Kerr effect, piezoelectric effect, and electrostriction. The electrooptical devices of the present invention can be widely used for controlling amplitude, phase, and frequency of optical signals, changing the direction of radiation beams, generating short (nanosecond and picosecond) light pulses, and creating tunable optical filters, electrooptical anisotropic thin crystal optical modulators and switches, optical means of protection against excess luminance (radiation limiters), beam deflectors, and other optical devices employed, in particular, in fiber optic communication systems.

While the present invention is disclosed by reference to the preferred embodiments and examples detailed above, it is to be understood that these embodiments and examples are intended in an illustrative rather than limiting sense, as it is contemplated that modifications and combinations will readily occur to those skilled in the art, which modifications and combinations will be within the scope of the invention and the scope of the appended claims.

What is claimed is:

1. A method of fabrication of an electrooptical device, comprising:
   depositing a colloid system of anisometric particles onto at least one electrode and/or onto at least one substrate and/or onto at least one layer of an isotropic or anisotropic material to form at least one layer of an electrooptical material;
   externally aligning the colloid system to form a preferred alignment of the colloid system particles;
   drying the colloid system; and
   forming at least one electrode and/or at least one layer of an isotropic or anisotropic material on at least a portion of the layer of the electrooptical material.

2. The method according to claim 1, wherein the colloid system is either subjected to an external action in order to reduce the system viscosity before the external alignment action, or this alignment action ensuring preferred alignment of the colloid system is produced in the course of the external action reducing the system viscosity.

3. The method according to claim 2, wherein the external action reducing the colloid viscosity is terminated after alignment of the system, or an additional external action is produced in order to restore viscosity of the colloid system at least on the initial level.

4. The method according to claim 2, wherein the external action upon the colloid system is produced by local and/or total heating of the substrate from the side opposite to the layer of electrooptical anisotropic material, and/or by local and/or total heating of the substrate and/or the colloid solution layer from the same side on which the layer of the electrooptical anisotropic material is formed.

5. The method according to claim 4, wherein the heating is performed using radiative and/or resistive heater, and/or an ac electric or magnetic field, and/or a flow of heated liquid and/or gas.

6. The method according to claim 2, wherein the external action upon the system is produced via a mechanical action upon the colloid solution layer applied onto a substrate.

7. The method according to claim 1, wherein the external alignment action upon the surface of an applied colloid solution is produced by a directed mechanical motion of at least one alignment device representing a knife and/or cylindrical wiper and/or flat plate or any other instrument oriented parallel to the applied layer surface and/or at an angle to this surface, whereby a distance from the substrate surface to the edge of the alignment device is preset so as to obtain an anisotropic thin crystal film of a required thickness.

8. The method according to claim 7, wherein a certain relief is made on the surface of the alignment device.

9. The method according to claim 7, wherein the alignment is performed by heated instrument(s).

10. The method according to claim 1, wherein the alignment is performed by application of an external electric field to the system.

11. The method according to claim 1, wherein the alignment is performed by application of an external magnetic field to the system.

12. The method according to claim 1, wherein the alignment is performed by application of an external electric and/or magnetic field to the system, with simultaneous heating.

13. The method according to claim 1, wherein the alignment is performed by illuminating the system with one or several coherent laser beams.

14. The method according to claim 2, wherein restoration of the system viscosity at least on the initial level is achieved by terminating the external action reducing the viscosity in the course of the alignment action.

15. The method according to claim 1, wherein the drying is performed at room temperature and a humidity of not less than 50%.

16. The method according to claim 1, wherein the anisotropic particles in the colloid system are crystalline.

17. The method according to claim 1, wherein lyotropic liquid crystals are employed as the colloid system.

18. The method according to claim 17, wherein the external action is selected so as to provide for a phase transition in the system.

19. The method according to claim 1, wherein a colloid system is used in which a disperse phase concentration is selected so as to ensure a thixotropic behavior of the system.

20. The method according to claim 1, wherein an additional aligning action upon the system after restoration of the initial colloid system viscosity is produced in the same direction as that in the main alignment stage.

21. The method according to claim 1, wherein the kinetic units of the colloid system are charged.

22. The electrooptical anisotropic thin crystal film obtained by the method according to claim 1.

* * * * *